United States Patent [19]
Lawther et al.

[11] Patent Number: 5,805,940
[45] Date of Patent: Sep. 8, 1998

[54] COMPACT CAMERA WITH FLIP-UP MULTI-LAMP FLASH WHEEL

[75] Inventors: Joel S. Lawther, East Rochester, N.Y.; Ralph M. Lyon, Marshfield, Wis.

[73] Assignee: Eastman Kodak Company, Rochester, N.Y.

[21] Appl. No.: 892,901

[22] Filed: Jul. 14, 1997

[51] Int. Cl.⁶ .................................................. G03B 15/03
[52] U.S. Cl. ............................................. 396/178; 362/13
[58] Field of Search ................................. 396/155, 176, 396/177, 178; 362/11, 13, 15

[56] References Cited

U.S. PATENT DOCUMENTS

| | | | |
|---|---|---|---|
| 2,408,470 | 10/1946 | Noel et al. | 362/15 |
| 3,447,433 | 6/1969 | Wick et al. | 396/197 |
| 4,101,915 | 7/1978 | Lange | 396/197 |
| 4,298,908 | 11/1981 | English et al. | 362/151 X |
| 5,122,828 | 6/1992 | Kobayashi et al. | 396/177 |

*Primary Examiner*—Eddie C. Lee
*Assistant Examiner*—J. K. Han
*Attorney, Agent, or Firm*—Roger A. Fields

[57] ABSTRACT

A compact camera comprising a camera body, a multi-lamp flash unit supported for movement relative to the camera body to advance respective flash lamps successively to a flash illumination position for illuminating a subject being photographed, and a drive assembly actuated in engagement with the flash unit to move the flash unit to advance the flash lamps to the flash illumination position in coordination with film movement to advance respective unexposed film sections successively to an exposure position in the camera body, is characterized in that the flash unit is supported for movement to a folded position collapsed to the camera body for compactness and to an unfolded position extended from the camera body to be used, and the drive assembly remains in engagement with the flash unit during movement of the flash unit between its folded and extended positions.

7 Claims, 4 Drawing Sheets

FIG. 1

COMPACT CAMERA WITH FLIP-UP MULTI-LAMP FLASH WHEEL

CROSS-REFERENCE TO RELATED APPLICATION

Reference is made to commonly assigned copending application Ser. No. 08/891,929, entitled COMPACT CAMERA WITH FLIP-UP MULTI-LAMP FLASH WHEEL and filed Jul. 14, 1997 in the names of Joel S. Lawther and Ralph M. Lyon.

FIELD OF THE INVENTION

The invention relates generally to the field of photography, and in particular to cameras. More specifically, the invention relates to a compact camera with a flip-up multi-lamp flash wheel.

BACKGROUND OF THE INVENTION

Manufacturers often look for ways to make cameras inexpensive and compact.

It is known for a camera to be used with an inexpensive, replaceable, multi-lamp flash wheel instead of a more expensive, built-in electronic flash unit. For example, the camera may have a multi-lamp flash wheel supported for rotation to advance respective flash lamps successively to a flash illumination position for illuminating a subject being photographed, and a drive assembly actuated in engagement with the flash wheel to rotate the flash wheel to advance the flash lamps to the flash illumination position in coordination with film movement to advance respective unexposed film sections successively to an exposure position. The camera, though inexpensive, is not compact.

The Cross-Referenced Application

The cross-referenced application discloses a compact camera comprising a camera body, a multi-lamp flash unit supported for movement relative to the camera body to advance respective flash lamps successively to a flash illumination position for illuminating a subject being photographed, and a drive assembly actuated to move the flash unit to advance the flash lamps to the flash illumination position in coordination with film movement to advance respective unexposed film sections successively to an exposure position in the camera body. The flash unit is supported for movement to a folded position collapsed to the camera body for compactness, and separated from the drive assembly to prevent actuation of the drive assembly from moving the flash unit, and to an unfolded position extended from the camera body to be used, and engaged with the drive assembly to permit actuation of the drive assembly to move the flash unit.

SUMMARY OF THE INVENTION

A compact camera comprising a camera body, a multi-lamp flash unit supported for movement relative to the camera body to advance respective flash lamps successively to a flash illumination position for illuminating a subject being photographed, and a drive assembly actuated in engagement with the flash unit to move the flash unit to advance the flash lamps to the flash illumination position in coordination with film movement to advance respective unexposed film sections successively to an exposure position in the camera body, is characterized in that:

the flash unit is supported for movement to a folded position collapsed to the camera body for compactness and to an unfolded position extended from the camera body to be used; and the drive assembly remains in engagement with the flash unit during movement of the flash unit between its folded and extended positions.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
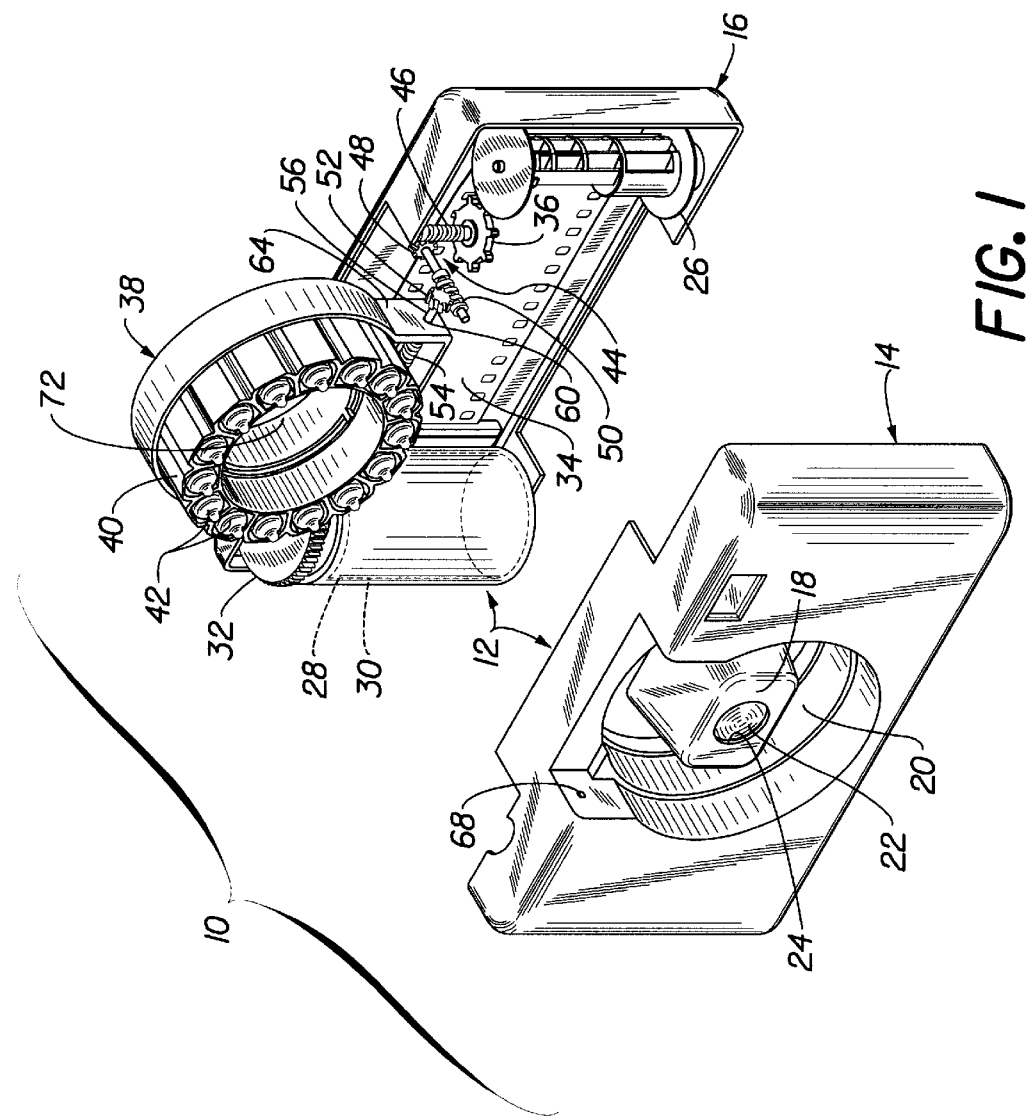
FIG. 1 is a front exploded perspective view of a compact camera with a flip-up multi-lamp flash wheel according to a preferred embodiment of the invention.

Referring now to the drawings, FIG. 1 shows a one-time-use camera 10 comprising a camera body 12 which constitutes a front body half 14 and a rear body half 16 that are connected together. The front body half 14 includes a lens snout 18 recessed within a front annular cavity 20 in the front body half. A taking lens 22 is mounted in a front opening 24 in the lens snout 18.

The rear body half 16 rotatably supports an unexposed film roll spool 26 and includes a chamber 28 that contains a conventional film cartridge 30. A thumbwheel 32 coaxially connected to a cartridge spool (not shown) in the film cartridge 30 is manually rotated to wind respective film sections 34 from the film spool 26 successively to an exposure position opposite the lens snout 18 and, thence, to the film cartridge. See FIG. 1. A known metering sprocket 36 is rotated in engagement with the film sections 34 during film movement from the film spool 26 to the film cartridge 30.

Figure 2:
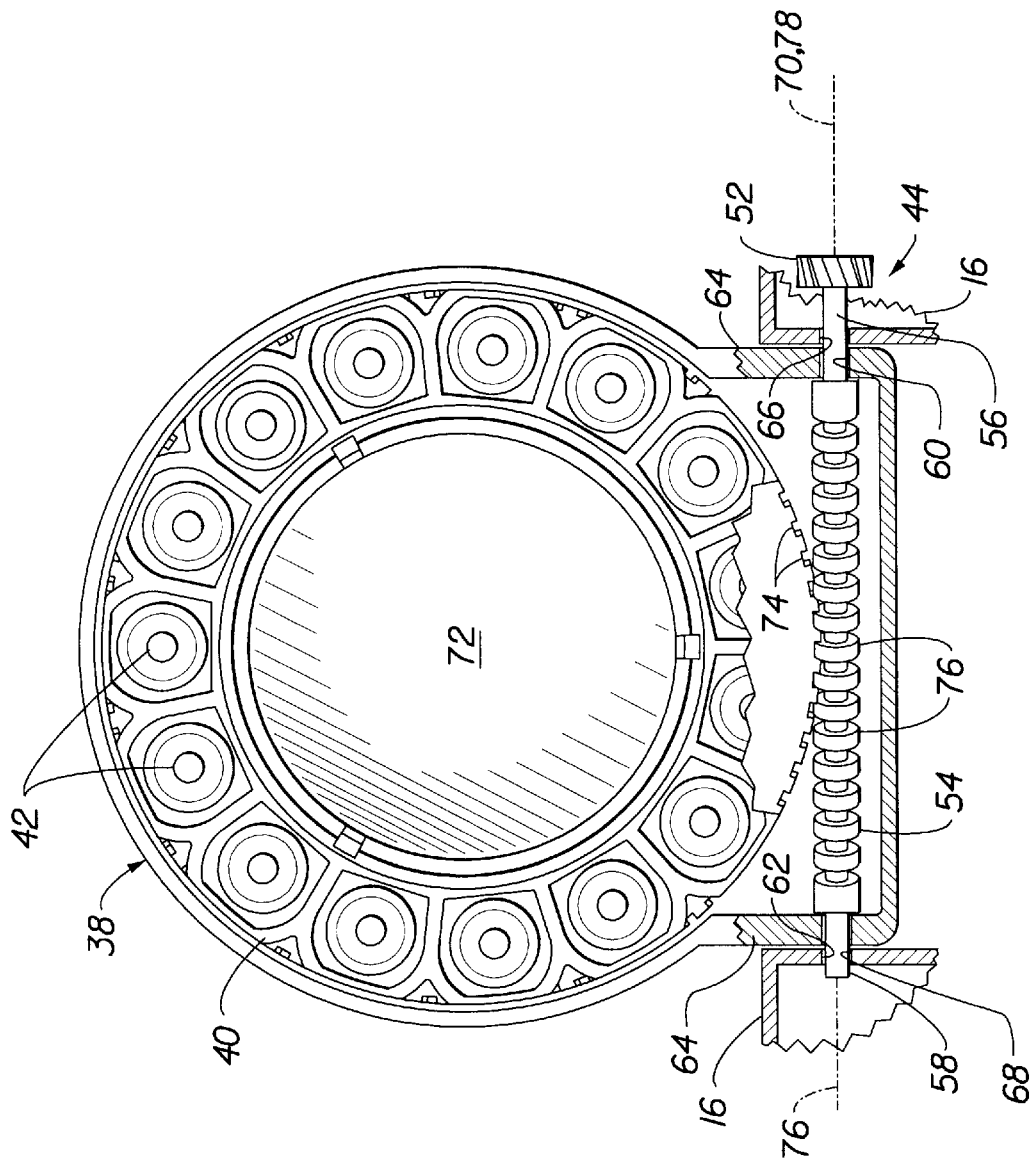
FIG. 2 is a front elevation view of the flash wheel.

As shown in FIGS. 1 and 2, a flash holder 38 rotatably supports a multi-lamp flash wheel 40 having a number of flash lamps 42 equal to the number of film sections 34 to be exposed.

A drive assembly 44 is adapted to rotate the flash wheel 40 within the flash holder 38 to advance the flash lamps 42 successively to a flash illumination position for illuminating a subject to be photographed in coordination with film movement of the film sections 34 from the film spool 26 successively to the exposure position. See FIGS. 1 and 2. The drive assembly 44 includes a helical worm gear 46 that is coaxial fixed to the metering sprocket 36 and in driving engagement with a pinion 48. The pinion 48 is coaxially fixed to a helical worn gear 50 in driving engagement with a pinion 52. The pinion 52 is coaxially fixed to a helical worm gear 54 via a relatively long shaft extension 56 of the helical worm gear. The relatively long shaft extension 56 of the helical worn gear 52 and an opposite end shaft extension 58 of the helical worm gear extend through respective holes 60 and 62 in an integral bracket 64 of the flash holder 38 and are rotatably supported in respective holes 66 and 68 in the front body half 14.

Figure 3:
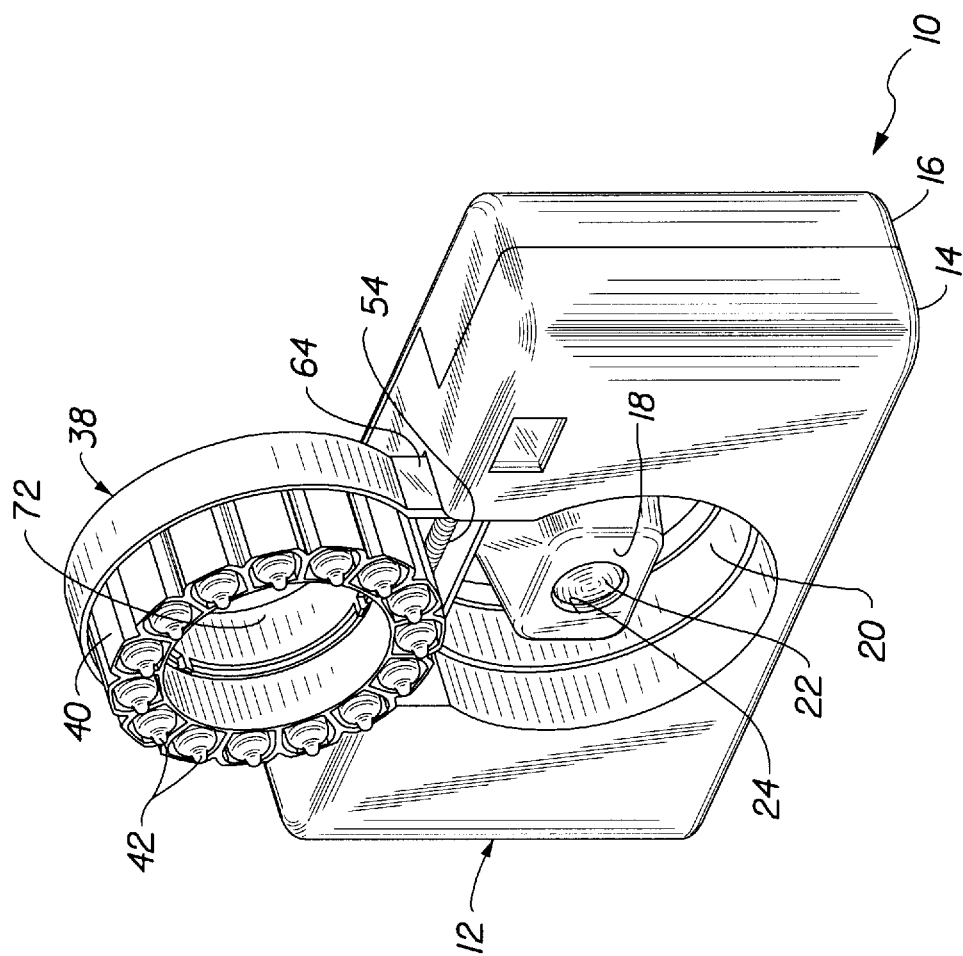
FIG. 3 is a front elevation view of the compact camera with the flash wheel flipped up for use.
Figure 4:
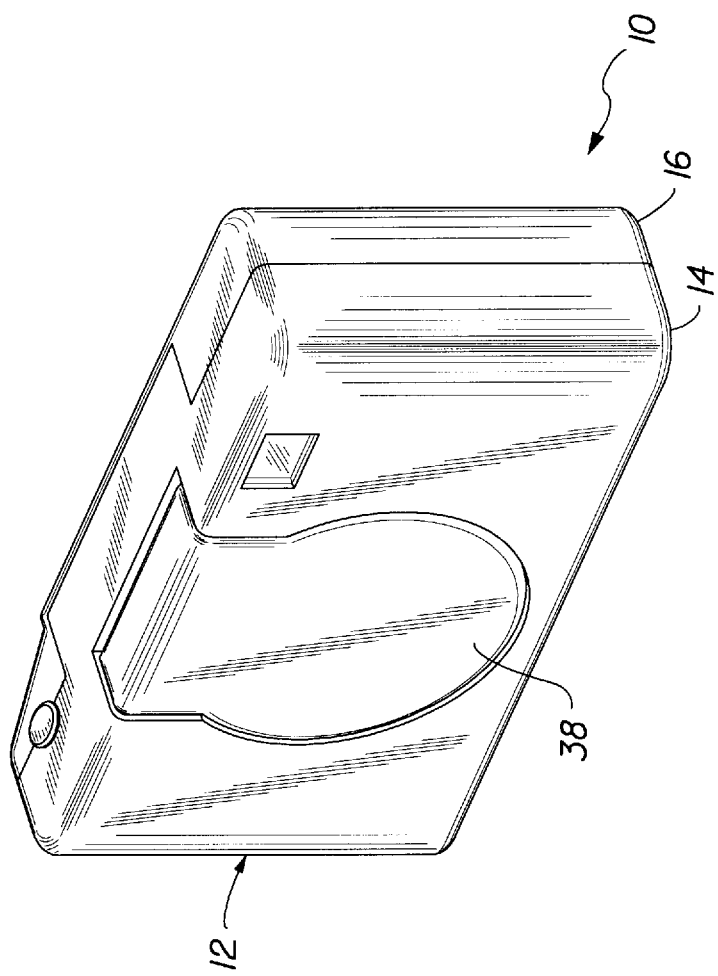
FIG. 4 is a front elevation view of the compact camera with the flash wheel flipped down for storage.

The flash holder 38 is pivotally supported on the shaft extensions 56 and 58 of the helical worn gear 52, at the holes 60 and 62 in the integral bracket 64 of the flash holder, for swinging movement about a pivot axis 70 between a folded position collapsed to the front body half 14 for compactness and an unfolded position extended from the front body half for use. The folded position of the flash holder 38 is shown in FIG. 4. The unfolded position of the flash holder 38 is shown in FIGS. 1–3. The flash holder 38 in the folded position covers the taking lens 22, and is flush with the front body half 14 This is possibly because the flash wheel 40 fits into the annular cavity 20 in the front body half 14 and, simultaneously, the lens snout 18 fits into a central opening 72 of the flash wheel.

When the flash holder 38 is in its unfolded position, shown in FIGS. 1–3, and its folded position, shown in FIG. 4, the helical worm gear 54 longitudinally extends tangent to a circular array of engageable notches 74 in the flash wheel 40. Consequently, when the flash holder 38 is in its unfolded position, rotation of the metering sprocket 36, each time one of the film sections 34 is moved to the exposure position, will rotate the helical worm gear 54 to move respective gear teeth 76 into engagement with the successive notches 74, to rotate the flash wheel 40 to advance one of the flash lamps 42 to the flash illumination position. The helical worm gear 54 has an axis of rotation 78 that is common with the pivot axis 70 of the flash holder 38. When the flash holder 38 is swung to its folded position, shown in FIG. 4, the circular array of notches 74 in the flash wheel 40 remain in engagement with the helical worm gear 54.

The invention has been described with reference to a preferred embodiment. However, it will be appreciated that variations and modifications can be effected by a person of ordinary skill in the art without departing from the scope of the invention. For example, the flash wheel 40 may be replaceable in a reusable camera.

PARTS LIST
10. one-time-use camera
12. camera body
14. front body half
16. rear body half
18. lens snout
20. annular cavity
22. taking lens
24. front opening
26. unexposed film roll spool
28. chamber
30. film cartridge
32. thumbwheel
34. film sections
36. metering sprocket
38. flash holder
40. flash wheel
42. flash lamps
44. drive assembly
46. helical worm gear
48. pinion
50. helical worm gear
52. pinion
54. helical worm gear
56. relatively long shaft extension
58. opposite end shaft extension
60. hole
62. hole
64. bracket
66. hole
68. hole
70. pivot axis
72. central opening
74. circular array of engageable notches
76. gear teeth
78. axis of rotation

What is claimed is:

1. A compact camera comprising a camera body, a multi-lamp flash unit supported for movement relative to said camera body to advance respective flash lamps successively to a flash illumination position for illuminating a subject being photographed, and a drive assembly actuated in engagement with said flash unit to move the flash unit to advance said flash lamps to the flash illumination position in coordination with film movement to advance respective unexposed film sections successively to an exposure position in said camera body, is characterized in that:

said flash unit is supported for movement to a folded position collapsed to said camera body for compactness and to an unfolded position extended from the camera body to be used; and said drive assembly remains in engagement with said flash unit during movement of the flash unit between its folded and extended positions.

2. A compact camera as recited in claim 1, wherein said flash unit includes a flash wheel rotatable to advance said flash lamps and having a circular array of engageable elements, and said drive assembly includes a rotatable drive member having respective engagement elements that engage said engageable elements to cause rotation of said drive member to rotate the flash unit when said drive member is rotated.

3. A compact camera as recited in claim 2, wherein said rotatable drive member is a helical worm gear arranged to be tangent to said circular array of engageable elements when said flash unit is in its unfolded and folded positions.

4. A compact camera as recited in claim 2, wherein said rotatable drive member is rotatable about an axis of rotation, and said flash unit is swingable to its folded and unfolded positions about a pivot axis common with the axis of rotation of said rotatable member.

5. A compact camera comprising a camera body, a flash holder configured to support a multi-lamp flash unit for rotation relative to said camera body to advance respective flash lamps successively to a flash illumination position for illuminating a subject being photographed, and a drive assembly actuated in engagement with the flash unit to rotate the flash unit to advance the flash lamps to the flash illumination position in coordination with film movement to advance respective unexposed film sections successively to an exposure position in said camera body, is characterized in that:

said flash holder is supported for movement to a folded position collapsed to said camera body for compactness and to an unfolded position extended from the camera body to be used; and said drive assembly remains in engagement with the flash unit during rotation of the flash unit between its folded and extended positions.

6. A compact camera as recited in claim 5, wherein said drive assembly includes a rotatable drive member having respective engagement elements that can engage individual mating elements of the flash unit to cause rotation of said drive member to rotate the flash unit when said drive member is rotated.

7. A compact camera as recited in claim 6, wherein said rotatable drive member is rotatable about an axis of rotation, and said flash holder is swingable to its folded and unfolded positions about a pivot axis common with the axis of rotation of said rotatable member.

* * * * *